Patented Jan. 9, 1940

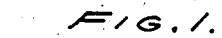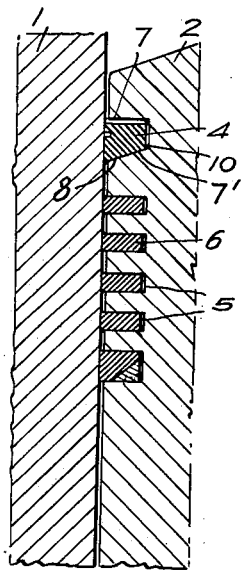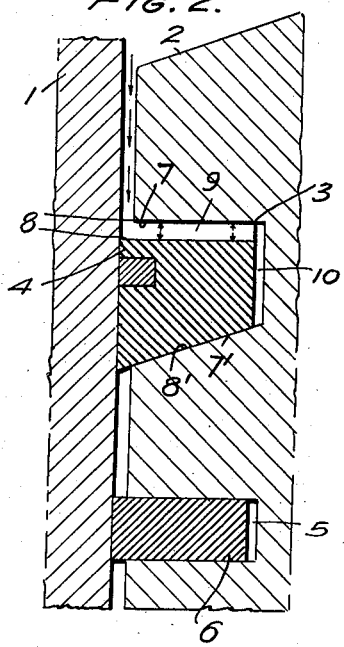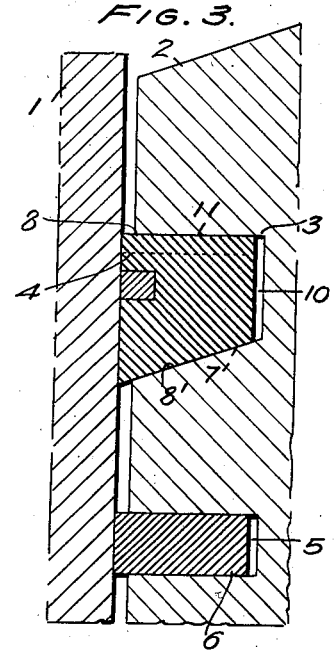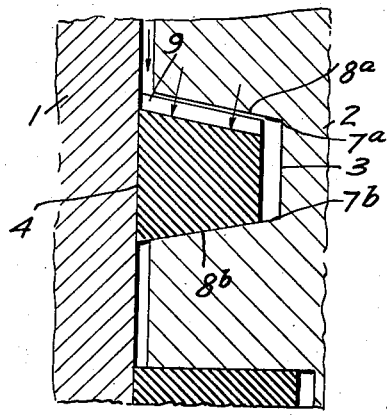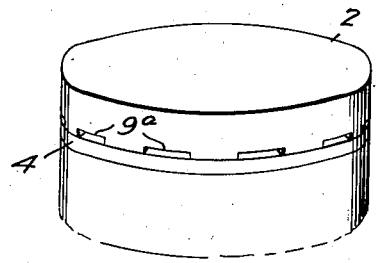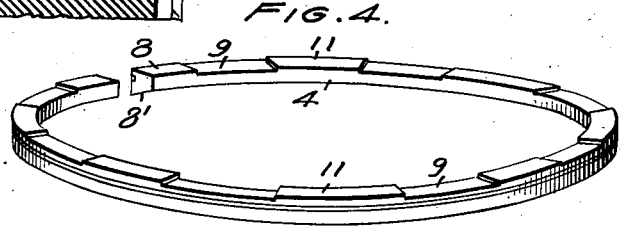

2,186,020

UNITED STATES PATENT OFFICE 2,186,020

PISTON PACKING

Chalmers G. Hall, Washington, D. C.

Application January 7, 1938, Serial No. 183,849

5 Claims. (Cl. 309—32)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to the art of packing pistons and specifically to a novel and improved piston and piston ring assembly for sealing a gas engine cylinder. The invention is not restricted to this particular use, however, but can be applied to compressors, pumps, shock absorbers or other devices for the prevention of compression losses or leakage.

The effective sealing of a gas engine cylinder against losses of compressed fuel and exploded gases by properly functioning piston rings is vital to the efficient operation of the engine, since the total power developed by the engine is dependent upon the initial compression and subsequent power delivery upon the explosion of the fuel mixture. Various and different types of piston packing rings have been devised from time to time for this purpose, and in all types of combustion engines, including small Diesel engines, piston rings heretofore developed have been generally satisfactory in forming an efficient seal. However, with the increased compression ratios resulting in higher peak pressures, standard piston rings have been found inefficient for sealing the gases both of the compression and power strokes, especially during the high pressure stages of the operating cycle; hence the need for a proper functioning ring which, in high compression engines, will effectively seal the cylinder against compression and power losses and prevent "blow by" of the fuel mixture on the compression stroke and of the exploded gases on the power stroke.

The object of the present invention, therefore, is to provide a novel piston and piston ring assembly which is especially adapted for high compression engines and especially for the Diesel engines being developed which result in high peak pressures, and to this end it embodies two essential characteristics, namely; the utilization of the pressure forces in the cylinder both on the compression stroke and the power stroke, and the principle of the inclined plane to expand the ring against the cylinder wall; and the provision of means of enabling the pressure forces to act quickly and effectively upon the upper face of the ring.

With the above object in view, the invention consists in the novel arrangement, construction and combination of parts hereinafter more fully described with reference to the accompanying drawing, wherein:

Figure 1 is a vertical sectional view of a part of a cylinder piston assembly embodying one species of the invention.

Figure 2 is an enlarged sectional detailed view of part of the improved packing assembly shown in Figure 1, the section being taken through a slotted portion of the top piston ring.

Figure 3 is an enlarged sectional detailed view somewhat similar to Figure 2 but showing the top piston ring in full cross section.

Figure 4 is a detail view, in perspective, of the top piston ring.

Figure 5 is a sectional view of a piston and piston ring assembly embodying another species of the invention, and Figure 6 is a view of a still further species of the invention.

Throughout the drawing, 1 indicates the side wall of an engine cylinder within which operates the piston 2, the latter being provided with an upper groove 3 for an expansible seal ring 4 and lower grooves 5 for oil rings 6.

In the species of the invention illustrated in Figures 1 to 4 inclusive, the top ring groove 3 of the piston is formed with its upper side wall 7 in a plane substantially at right angles to the axis of the piston and its lower wall 7' in a plane oblique to the axis of the piston; the said lower wall being inclined downwardly and outwardly of the piston as shown. The sealing ring 4 is also formed with its upper face 8 substantially at right angles to the axis of the piston and its lower face 8' inclined or beveled to correspond to the shape of the groove 3. In order that the seal ring 4 may be actuated by the gas pressures in the engine cylinder bearing on the top side of the piston ring, a series of substantially equi-spaced, radially disposed wide slots or conduits 9 are provided in the upper face of the ring and extend across the ring for the full width of the face. These wide slots are relatively shallow but sufficient in depth as shown in Figure 3, to permit the rapid flow of gases over the top of the ring. The ring 4 is seated in the ring groove 3 so that the inclined face 8' of the ring contacts with the inclined wall 7' of the ring groove and the dimensions of the ring are such that the latter substantially fills the groove with a slight clearance 10 at the back of the piston ring and minimum clearance between the top wall of the ring groove and the non-slotted portions 11 of the piston ring. It is obvious that the slots may extend over slightly more than half the top face of the ring and yet leave sufficient surface or lands to prevent ring pounding while at the same time produce a condition akin to excessive groove clearance. The slotted and non-slotted portions of the ring which are exposed to the pressure of the gases are preferably flat surfaces in planes substantially at right angles to the axis of the piston.

By reason of the slots in the upper face of the piston ring, full width portions or areas of the top surface of the ring are exposed to the direct and full application of the pressure of the gases in the engine cylinder at the same instant at which the gases attempt to force themselves between the ring and the wall of the cylinder. This full and instantaneous application of fluid pressure to the top face of the ring, in conjunction with the outwardly inclined faces of the ring and grooves, provides an outward instantaneous pressure-component holding the ring in sealing relation with respect to the cylinder wall. The time during which pressure is applied to the top of the piston ring is an important factor in the prevention of compression losses and blow-by, as will be apparent from the following observations. As is well known, the clearance space between the piston rings and the cylinder wall is entirely and continually filled by a lubricating film of adequate body to withstand the pressure of the gases seeking to escape past the piston rings. Under conditions of normal power outputs, such as are obtained with the usual commercial engine, and with properly functioning piston rings, the resistance of the oil film is usually sufficient to withstand effectively any passage, or blow-by, of the combustible fuel past the rings. With increase in engine speeds and with an extremely high rate of pressure rise, blow-by becomes more prevalent. This is attributable to the fact that during the high pressure stages of the operating cycle the resistance of the oil film at the outside diameter of the piston ring is overcome by the high fluid pressure within the cylinder to such an extent that the gases force themselves between the wall of the cylinder and the upper outer edge of the ring. Although the oil film may be not entirely blown out from between the ring and the cylinder wall, it will be partially displaced at its upper end and the force of the displacing gases, acting against the upper outer edge of the ring, overcomes the ring tension sufficiently to push the ring further away from the cylinder wall. The already weakened oil film, being rendered less resistant by the withdrawal of the support of the ring, is unable to withstand effectively the pressure applied thereto and, hence, blow-by results. In high speed engines the time interval during which pressure is applied to the ring is too short to enable the pressure to reach the back of the ring before the latter is pushed away from the cylinder wall. Moreover, the pressure at the back of the ring would be ineffective to counteract the pressure at the face of the ring where the circumferential area is greater than at the back in proportion to the difference between the outside and inside diameters of the ring. The counteracting force to be effective in preventing the ring from leaving the cylinder wall, must be applied to the top of the ring and the bottom faces of the ring and groove must be angularly disposed to provide an outward instantaneous component forcing the ring against the wall of the cylinder. The present invention is designed to function on this principle; the circumferentially spaced slots 9 providing open spaces through which full width areas of the top face of the piston ring are exposed to the direct and full application of the fluid pressure in the cylinder. Thus, the said pressure acts against the exposed top areas of the ring at the same instant at which it attempts to force itself between the ring and the wall of the cylinder; the magnitude of the force in conjunction with the inclined faces of the ring and groove providing a component of force effective to hold the ring in sealing relation with respect to the wall of the cylinder. The pressure of the ring against the oil film strengthens the latter and renders it more resistant to being blown out from between the rings and the cylinder wall, particularly during the high pressure stages of the operating cycle. In current practice, the slight clearance usually provided between the upper sides of a piston-ring and its ring groove is not sufficient to permit the rapid flow of gases over the top of the ring and the retardation of the gas flow necessarily causes a delay or lag in the transmission of pressure across the top of the ring. With the slots 9 of the invention, however, there is less restriction to the flow of gases across the top of the ring and the expansion of gases throughout the spaces defined by the slots occurs very rapidly. Thus, as indicated by the arrows in Figure 2, vertical components of the gas pressure act substantially instantaneously and perpendicularly against the upper face of the piston ring from the outer to the inner edge of the latter and press the ring uniformly and evenly downward against the slanting lower wall of the ring groove whereupon the piston ring is expanded radially into effective sealing relation with respect to the cylinder wall. Since the downward pressure across the full width of the ring is substantially uniform, there will be no unbalance of pressure between the outer and inner portions of the ring to cause the latter to rock or teeter on the lower edge of the ring groove or otherwise to set up forces tending to cause the ring to bind or stick in its groove. In reducing the invention to practice, the angle of inclination of the sloping walls 7' and 8' of the ring groove and piston ring respectively will be varied to suit individual operating conditions.

Figure 5 of the drawing illustrates another species of the invention. In this instance, the ring groove 3 and the seal ring 4 are beveled or inclined on their top sides 7a and 8a as well as on their lower sides 7b and 8b. By this arrangement, the change of direction in the flow of gases passing into the conduits 9 from the clearance space between the piston and the cylinder wall is less abrupt; the angle of change being less than a right angle. Since the conduits slope inwardly and downwardly of the ring groove, the flow of gases across the top of the ring 4 is expedited. Moreover, the pressure at the top of the ring acts more directly and with greater force against the ring to expand the same against the cylinder wall, due to the obliquity of the upper side walls of the piston ring and the piston ring groove and the fact that the pressures acting perpendicularly against the oblique top face of the ring exert forces in a direction downward and outward of the ring groove, as indicated by the arrows.

Figure 6 illustrates a construction wherein the means of enabling the gas pressures to act quickly and effectively upon the upper face of the ring is provided in the piston instead of in the piston ring. This may be done by providing slots in the upper wall of the ring groove as shown at 9a.

Various other modifications and changes in the construction and specific details of the ring and groove may be made, within the scope of the appended claims, for accomplishing the purposes and objects of the invention without departing from the principle of the same as herein illustrated and explained.

Having thus described the invention, what I claim is:

1. A piston and piston ring assembly for a fluid pressure cylinder comprising a piston having a ring groove, a piston ring having a substantially snug fit in the ring groove without binding or sticking at any point, one side face of the said groove and the corresponding side face of the ring being inclined toward the periphery of the piston, and pressure passageways between the opposite side face of the ring and the corresponding side face of the groove and opening inwardly and radially of the piston at circumferentially spaced points to expose full width areas of the said opposite side face of the ring to the direct and full application of the fluid pressure in the cylinder so that said pressure acts against the said exposed areas of the ring at the same instant at which it attempts to force itself between the ring and the wall of the cylinder and with such magnitude as to provide in conjunction with the inclined faces of the ring and groove a component of force effective to hold the ring in sealing relation with the wall of the cylinder.

2. A piston and piston ring assembly for a fluid pressure cylinder comprising a piston having a ring groove, an expansible piston ring having a substantially close fit in the said groove without binding or sticking at an point, the innermost side face of the groove and the corresponding side face of the ring being inclined and outwardly divergent with respect to the opposite side faces of the ring and groove, and a plurality of wide and relatively shallow passageways contiguous to the clearance space between the said opposite side faces of the ring and groove and extending radially of the piston from the outer end to the inner end of the groove, said passageways having a combined orifice area effective to expose so much of the said opposite side face of the ring to the fluid pressure within the cylinder that said pressure impinges directly upon the exposed portions of the ring at the same instant at which it attempts to force itself between the ring and the wall of the cylinder and with such magnitude as to provide in conjunction with the said inclined faces of the ring and groove a component of force effective to hold the ring in sealing relation with respect to both the inclined face of the groove and the wall of the cylinder.

3. A piston and piston ring assembly for a fluid pressure cylinder comprising a piston provided with a ring-receiving groove, and a piston ring having a substantially close fit in the said groove, one side face of the said groove and the corresponding side face of the ring being inclined outwardly and downwardly with respect to the axis of the piston, the opposite side face of the said groove having radial indentations therein to expose so much of the corresponding face of the ring to the full and direct application of the fluid pressure in the cylinder that the said pressure acts against the exposed face portions of the ring substantially at the same instant it attempts to force itself between the ring and the wall of the cylinder and with such magnitude as to provide, in conjunction with the inclined sides of the ring and groove a component of force effective to hold the ring in sealing relation with respect to the cylinder.

4. A piston and piston ring assembly for a fluid pressure cylinder comprising a piston provided with a groove having an inclined side wall, and a piston ring having a substantially close fit in the said groove without binding or sticking at any point, one side face of said ring being inclined to correspond to and contact with the inclined wall of the groove and the opposite side face of the ring being provided with radial indentations at circumferentially spaced points to leave sufficient lands to prevent ring pounding while at the same time producing a condition akin to excessive ring clearance, the indentations being relatively shallow but of a combined capacity effective to expose so much of the indented face of the ring to the full and direct application of the fluid pressure in the cylinder that the said pressure acts against the said face of the ring substantially at the same instant at which it attempts to force itself between the ring and the wall of the cylinder and with such magnitude as to provide in conjunction with the inclined walls of the groove and ring a component of force effective to hold the ring in sealing relation with respect to the cylinder wall.

5. A piston and piston ring assembly for a fluid pressure cylinder comprising a piston having a peripheral groove and a piston ring closely fitting the groove, said ring and groove respectively having their top and bottom faces inclined to a plane normal to the axis of the piston and converging inwardly of the piston, one of the said top faces having spaced radial slots extending across the full width thereof to provide excess clearance at circumferentially spaced points between the top of the ring and the groove through which full width areas of the top face of the ring are exposed to the direct application of the fluid pressure in the cylinder whereby said pressure will act against the exposed areas of the ring at the same instant at which it attempts to force itself between the ring and the wall of the cylinder and with such magnitude as to provide in conjunction with the inclined faces of the ring and groove a component of force effective to hold the ring in sealing relation with respect to the wall of the cylinder.

CHALMERS G. HALL.